Dec. 10, 1963

T. W. SAFFORD 3,113,789

BUMPER HITCH ASSEMBLY

Filed Dec. 1, 1961

INVENTOR
THOMAS W. SAFFORD

BY John Gibson Semmes

ATTORNEY

Dec. 10, 1963

T. W. SAFFORD 3,113,789

BUMPER HITCH ASSEMBLY

Filed Dec. 1, 1961

INVENTOR
THOMAS W. SAFFORD

BY John Gibson Semmes

ATTORNEY

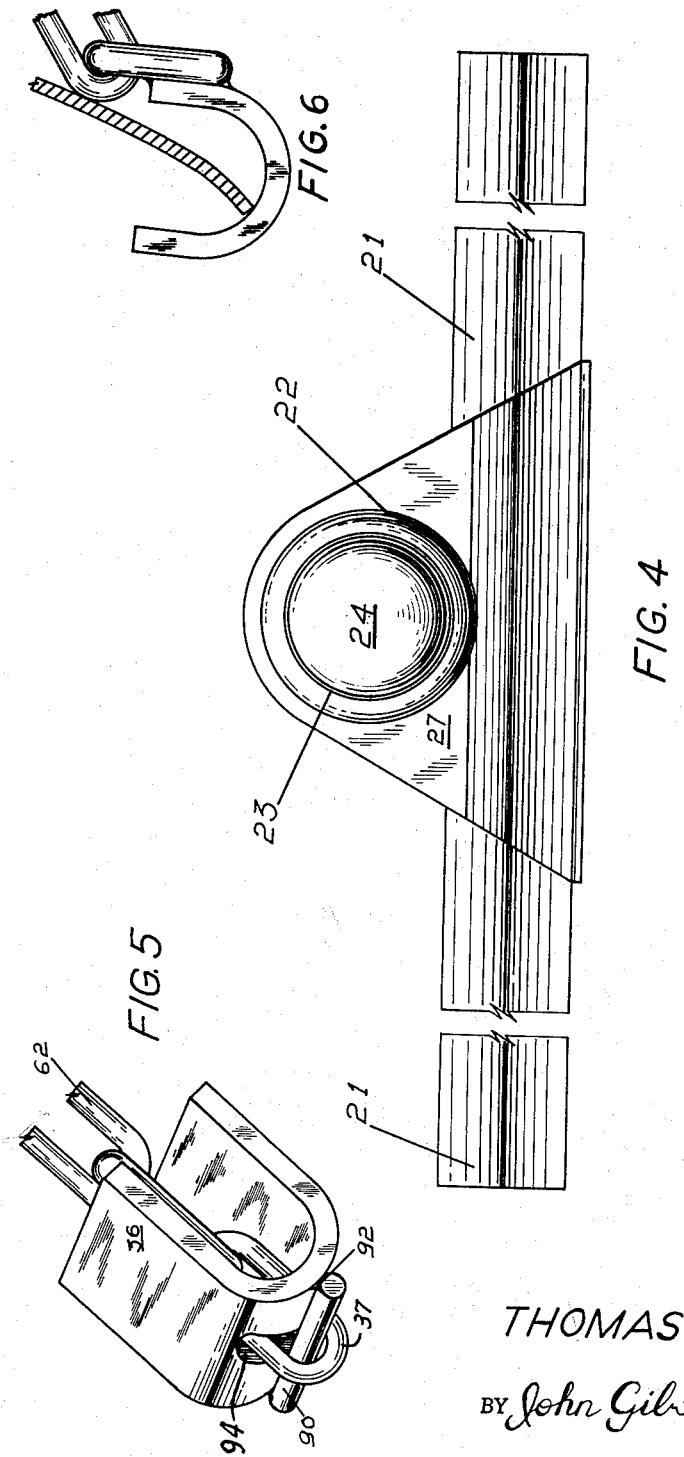

3,113,789
BUMPER HITCH ASSEMBLY
Thomas W. Safford, Santa Clara, Calif., assignor to Arcoa, Inc., Portland, Oreg., a corporation of Oregon
Filed Dec. 1, 1961, Ser. No. 156,223
10 Claims. (Cl. 280—502)

The present application relates to bumper hitch assemblies, particularly a temporary or "rental" hitch assembly which is easily fastenable to various types of automobile bumpers.

Previous inventors have patented bumper hitches which are fastenable to various types of bumpers. However, a shortcoming of these previous devices has been in the complexity of the fastenings which have required turning by especial wrench or like tools and practically necessitated attaching of the hitch only by a trained expert. These earlier devices have provided adjustability to various types of bumpers principally by an elongated thread bolt upon which the housing assembly is clamped towards the bumper of the pulling auto. Needless to say the long bolt has interfered with practical operation of the hitch and in many cases has resulted in damaging of the automobile trunk upon sudden braking or stopping. Also, these earlier devices being attachable to the center of the bumper have thus been attached to the weakest portion of the bumper where there is no support between the bumper and pulling auto. A final shortcoming of these earlier devices has been their failing to provide certain means for adjusting the hitch ball socket so that the socket pulling portion is supported in the middle, rather than at the top or the bottom of the auto bumper.

The present device comprises a horizontal bar about which there is medially positioned a triangular shaped bracket mounting the ball socket. Positioned about the bar at either side of the hitch are the bumper clasping elements which are slidable upon the bar so that they may engage the top and bottom of the auto bumper at a position directly opposite the bracket which connects the bumper and auto frame. This horizontal positioning of the bumper clasping elements provides for securing of the bumper hitch at the strongest part of the bumper. Also, the triangular configuration of the hitch bracket insures that pulling or pushing, braking forces will be transmitted outwardly from the center of the bar and the apex of the bracket towards the stronger bumper clasping portions. Each of the bumper clasping elements contains a top chain and bottom chain with bumper clasping hooks which grab respectively the top and bottom of the auto bumper. Means are provided in the bumper clasping housing for locking the top chain and for tightening the bottom chain; consequently, the tightening of the chains while exerting opposed pulling forces on the top and bottom of the bumper provides means for adjusting the level of the hitch bar and thus the ball hitch with respect to the top and bottom of the bumper. This adjustability of the hitch bar eliminates the creation of destructive moments between hitch bar and bumper upon sudden stopping and pulling. Such said moments when induced in conventional bumper hitch assemblies have resulted in complete wrenching of the bumper hitch assembly from the pulling auto.

Accordingly, it is an object of invention to provide a hitch bar assembly which is easily attachable to any type of automobile bumper.

Another object of invention is to provide a bumper hitch assembly wherein the position of the bumper hitch may be adjusted with respect to the top and bottom of the bumper.

Another object of invention is to provide a bumper hitch assembly wherein the means clasping the bumper exert opposed pulling forces on the top and bottom of the bumper.

Yet, another object of invention is to provide a bumper hitch assembly which may be secured to the bumper without the use of especial tools.

Yet additional objects of invention will become apparent from the ensuing specification and attached drawings wherein:

FIG. 4 is a top plan of the ball hitch mounted upon hitch bar 21.

FIG. 5 is a fragmentary perspective showing lower bumper hook 36 connected to lower chain 62 by retainer pin 90.

FIG. 6 is a fragmentary perspective of a conventional bumper hook connected to lower chain and "rolling off" the auto bumper, as the chain is tightened.

Figure 1:
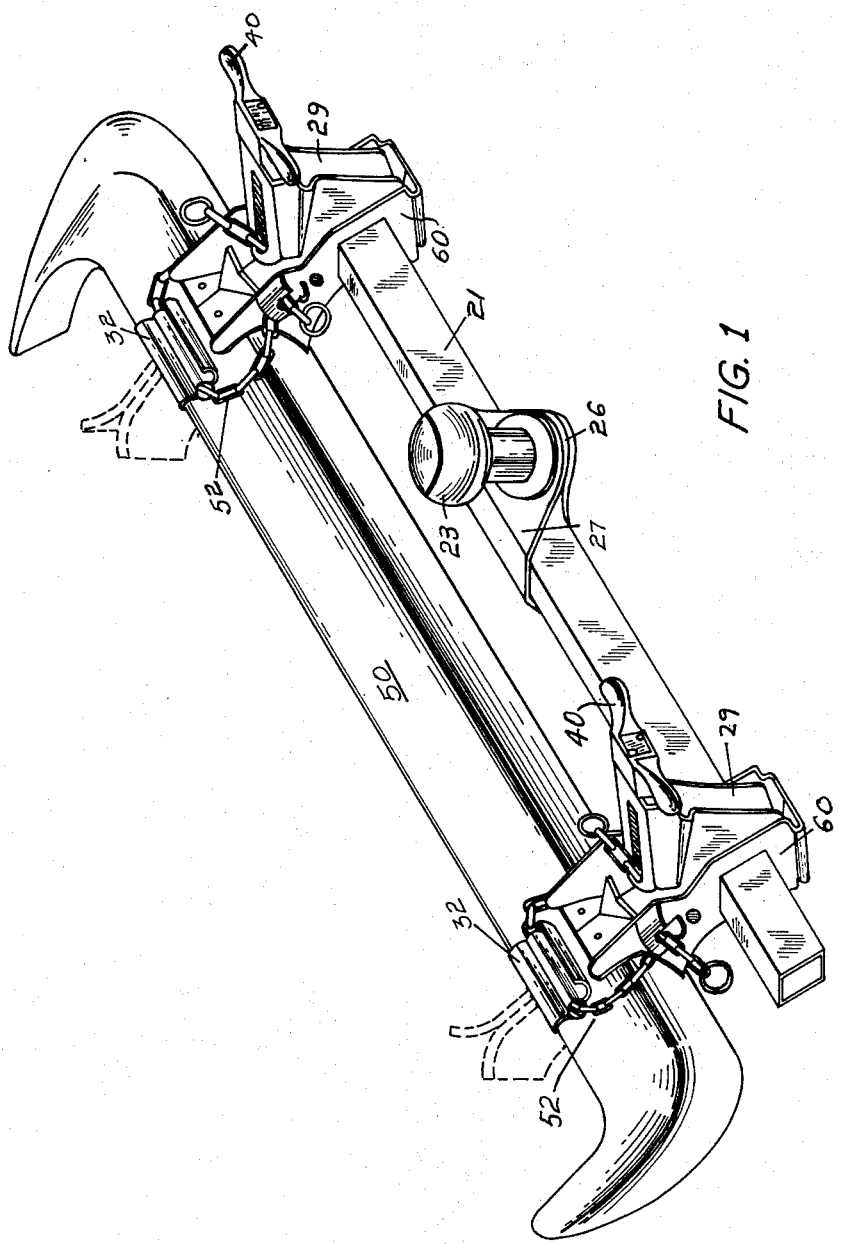
FIG. 1 is a perspective view of the bumper hitch assembly showing the bumper clamping elements positioned opposite the automobile frame members (shown in phantom).
Figure 2:
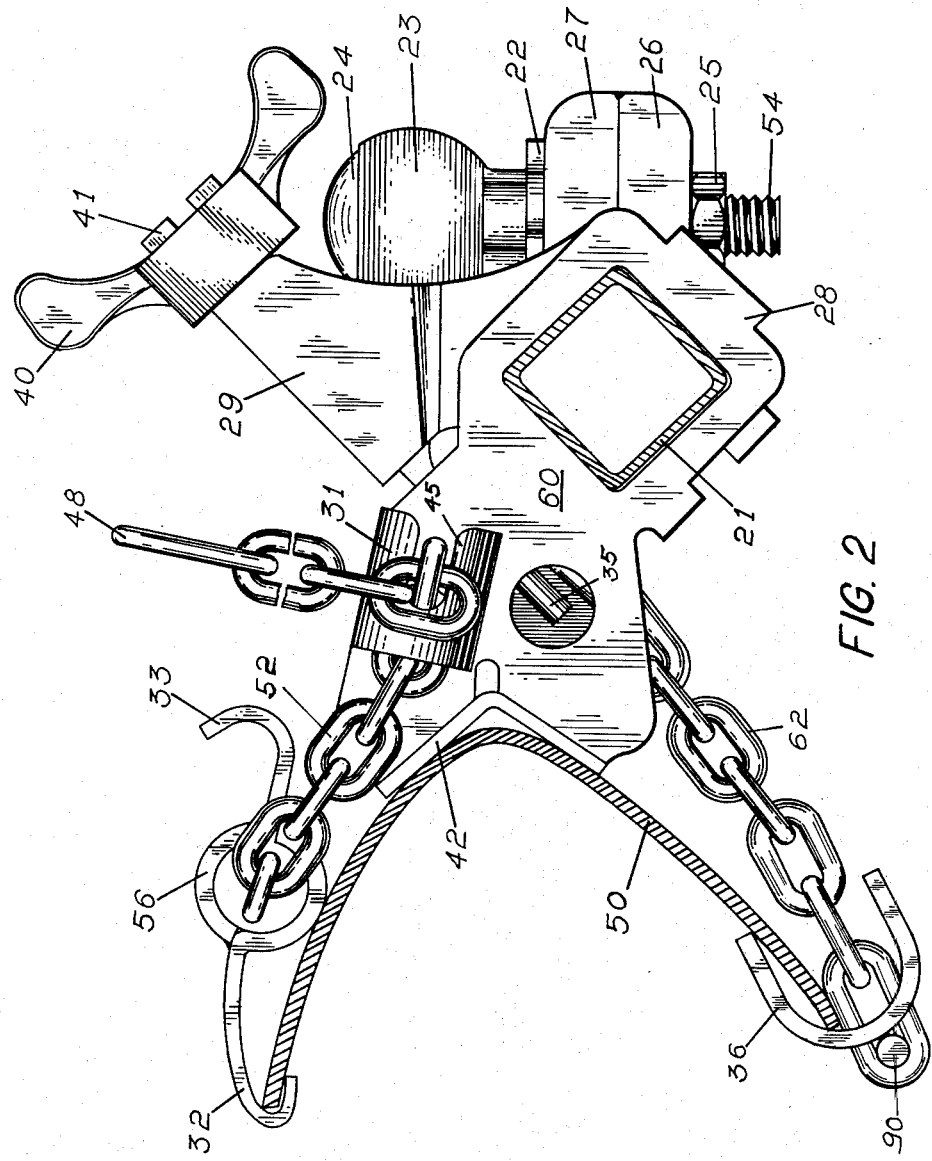
FIG. 2 is a side elevation of the assembly clamped upon the top and bottom of a bumper shown in cross section.
Figure 3:
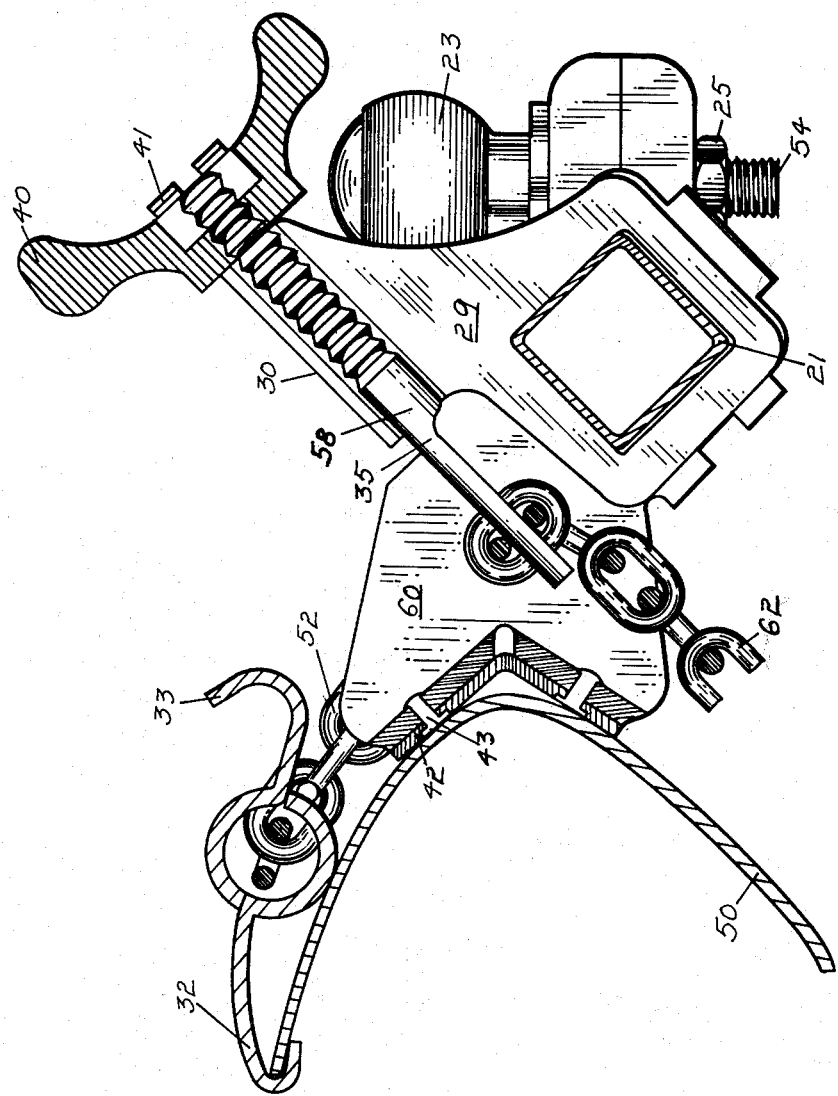
FIG. 3 is a vertical cross section of the bumper of the bumper clamping element, showing threaded bolt means for tensioning bottom chain 62.

In FIG. 1 the bumper hitch assembly is shown comprising horizontal hitch bar 21 to which is attached triangular bracket 22. Rounded piece 23 having base flange 22 supports hitch bolt 24 which extends through the bracket 26 and 27 and by means of nut 25 engaging threads 54. As shown in FIGS. 1 and 4 hitch bracket pieces 26 and 27 extend substantially around hitch bar 21. Significantly, hitch bar 21 is diagonally positioned so that the trailer pulling and pushing forces are exerted principally on the stronger corner portions of the hitch bar, rather than on the flat side portions of the bar as in conventional hitch bar assemblies. The hitch bar housing also extends about the hitch bar 21 and includes a bumper abutting or outer portion which extends towards the bumper exposed surface and an inner housing 29 through which extends threaded bolt 58. At the lower end of bolt 58 adjusting bolt lug plate 35 extends into outer portion 60. As illustrated in FIGS. 1–3, both inner housing 29 and outer portion 60 independently encircle hitch bar 21. Wing-nut 40 may be positioned about bolt 58 and secured thereto by means of spinner nut 41. Top chain 52 extends through either side of the chain stop 31 and is secured therein by retainer ring 48. Top chain 62 extends through tubular portion 56 of the universal clamp formed by the short radius top hook 32 and wide radius top hook 33. Either top hook 32 or 33 may be attached to the bumper top and then top chain 52 tightened by locking in the notches 45 of chain stop 31. Lower bumper hook 36 is attached to lower chain 62 by means of lower hook connector 37 which is supported in medial aperture 94 in the base of the U-shaped hook 33 and engages retainer pin 90 traversing aperture 94 and fixed to hooks 36 by welds 92. Lower chain 62 extends through bumper portion 60 and into a medial aperture in lug plate 35. There are several advantages in utilization of retainer pin 90, instead of conventionally welding lower chain 62 to an end of hook 36, as illustrated in FIG. 6. First, since pin 92 is attached medially of hook 36 either side of hook 36 may be used to clasp bumper 50. This eliminates the necessity for twisting chain 62 in order to place hook 36 upon bumper 50. A twisted chain, of course, would break more easily and would prevent fine tensioning adjustment by means of lug plate 35. Secondly, as chain 62 is tightened, hook 36 is bound securely against bumper 50 and there is less opportunity for it to "roll off" the bumper, as illustrated in FIG. 6. Thirdly, the medial connection provides that chain 62 pulls medially from the hook so as to ensure wrapping of hook 36 around bumper 50. Fourthly, retainer pin 92 permits hook 36 to rock freely about the last link of lower chain 62 to conform to bumper 50 edge and the connection between chain 62 and hook 36 is not directly dependent upon the quality of a weld. Lug plate 35 is actuable towards and away from the bottom of the bumper by means of movement of wing-nut 41 upon bolt 58. The forward end of the bumper engaging portion may include a webbing pad 42 secured thereto by means of rivets 43. As will be seen, chain stop 31 provides for tightening of top chain 52 in half chain links thus providing a finer adjustability than in conventional devices. Tightening of bottom chain 38 by means of wing-nut 41 provides a final vertical adjustment of the ball socket assembly with respect to the middle of the auto bumper. As top chain 52 and bottom chain 62 tighten, they respectively turn outer portion 60 and inner housing 29 in opposite directions about hitch bar 21. Thus, there is produced a wrenching action on the bar which locks the members 29 and 60 in place and prevents their sliding laterally. Consequently, there is eliminated the necessity for providing separate means locking the bumper clasping elements to the bumper.

The horizontal adjustability of the bumper clasping elements about bar directly opposite the brackets connecting the bumper to the auto frame 21 permits the assembly to transfer the pull and push force of the trailer directly to the autoframe. The unit is self-contained and requires neither adjusting plates nor adaptor plates. Short bolt 58 effectively tensions the entire assembly with respect to the bumper and eliminates the necessity for the conventionally long bolt. The concave bumper engaging portion fits bumper 50 and thus eliminates the conventional spacing between the adjustor plates and the bumper. Furthermore the short new bolt 58 permits the operator to open the vehicle trunk without removal of the hitch assembly. Conventional long bolts sacrifice this convenience for adaptability of the hitch to many modes of automobiles. Conventional ball hitches are neither above nor below the middle of the bumper creating a moment which twists the bumper vertically during braking and pulling action. Even when the configuration of the bumper necessitates positioning of the bumper clasping elements in the middle; as opposed to the ends of the bumper, the present unit provides increased strength by virtue of the opposed pulling effects exerted by hooks 32 and 36 on the top and bottom of the bumper. As will be seen from the foregoing, a principal purpose of the present invention has been to eliminate center bumper hitching in non-permanent, removable or rental type hitches.

Manifestly, numerous modifications in the structure may be employed without departing from the spirit and scope of invention as defined in the subjoined claim.

I claim:
1. A bumper hitch assembly comprising:
  (a) a horizontal bar,
  (b) a hitch medially positioned upon said bar, and
  (c) bumper clasping elements adjustably positioned upon said bar at either side of said hitch, said elements further including
    (i) a housing extending about said bar,
    (ii) a separate bumper contact portion extending from said bar towards the bumper,
    (iii) bumper top clasping means extending from said bumper contact portion and bumper bottom clasping means extending from said housing to said bumper, and
    (iv) means tightening one of said clasping means so as to secure said bumper contact portion against said bumper.

2. A bumper hitch as in claim 1, said bumper clasping means being separately tightenable so as to exert opposed pulling forces upon the top and bottom of said bumper.

3. A bumper hitch assembly comprising:
  (a) a horizontal bar,
  (b) a hitch medially positioned upon said bar, and
  (c) bumper clasping elements adjustably positioned upon said bar at either side of said hitch, each of said elements including:
    (i) a housing extending about said bar,
    (ii) a separate bumper contact portion extending from said bar towards the bumper,
    (iii) bumper top clasping means extending from said bumper contact portion and bumper bottom clasping means extending from said housing to said bumper, and
    (iv) a lock engaging one of said clasping means and positioned in said bumper contact portion, and
    (v) an adjustable pulling means engaging the other of said clasping means.

4. A bumper hitch as in claim 3, said bumper clasping means including at their ends universal hook means for engaging a plurality of different sized bumpers.

5. A bumper hitch assembly as in claim 3, said bump-clasping means being positionable upon the top and bottom of said bumper.

6. A bumper assembly as in claim 3, said bumper hitch including a ball joint attached to said bar by means of a triangular bracket with the diverging sides of said bracket extending from said ball joint towards the ends of said bar.

7. A bumper clasping element mountable upon a horizontal bar supporting a hitch and comprising:
  (a) an inner housing extending around said bar,
  (b) an outer bumper engaging portion independently extending around said bar and from said bar towards the bumper,
  (c) a top chain extending from said bumper engaging portion towards said bumper,
  (d) a top bumper clasp attached to said top chain,
  (e) a bottom chain extending from said inner housing,
  (f) a bottom bumper clasp attached to said bottom chain,
  (g) a chain stop attached to said outer bumper engaging portion and engaging said top chain, and
  (h) a lug plate adjustably fitted in said inner housing and connected to a threaded bolt means supported in said inner housing and secured thereto by nut means, said bottom chain engaging said lug plate, and being tightened by turning of said nut upon said bolt.

8. A bumper clasping element as in claim 7, at least one of said bumper clasps having a plurality of patterns for engaging differently configured bumpers.

9. A bumper clasping element as in claim 7, said bar being adjustable with respect to said bumper by means of said top and bottom chains so that the hitch pulling portion is positioned between the top and bottom of said bumper.

10. A bumper clasping element as in claim 7, said bottom bumper clasp being of U-shaped configuration with a medial aperture in the base of the U-shape and including a retainer pin secured to said base and traversing said aperture, a link of said bottom chain being encircled about said pin and supported in said aperture.

References Cited in the file of this patent
UNITED STATES PATENTS 2,668,064   Bolling   Feb. 2, 1954
2,772,099   Smith   Nov. 27, 1956